(12) United States Patent
Chen

(10) Patent No.: US 7,102,295 B2
(45) Date of Patent: Sep. 5, 2006

(54) ELECTRONIC DEVICE WITH ILLUMINATION CIRCUIT AND EL DEVICE UTILIZING THE SAME

(75) Inventor: Chuan-Chu Chen, Taoyuan (TW)

(73) Assignee: Benq Corporation, Taoyuan (TW)

( * ) Notice: Subject to any disclaimer, the term of this patent is extended or adjusted under 35 U.S.C. 154(b) by 30 days.

(21) Appl. No.: 10/781,485

(22) Filed: Feb. 18, 2004

(65) Prior Publication Data

US 2004/0178745 A1 Sep. 16, 2004

(30) Foreign Application Priority Data

Mar. 13, 2003 (TW) ............................. 92105466 A

(51) Int. Cl.
*H05B 41/24* (2006.01)
*H05B 41/36* (2006.01)
(52) U.S. Cl. ..................... 315/276; 315/248; 315/291
(58) Field of Classification Search ............... 315/276, 315/57, 70, 354, 192, 291, 88, 248; 323/247; 314/32
See application file for complete search history.

(56) References Cited

U.S. PATENT DOCUMENTS

| | | | |
|---|---|---|---|
| 4,017,761 A * | 4/1977 | Woldring ..................... 315/99 |
| 4,032,817 A * | 6/1977 | Richmond ................... 315/149 |
| 4,047,076 A * | 9/1977 | McNamara, Jr. .............. 315/88 |
| 4,099,095 A * | 7/1978 | Turner ......................... 315/92 |
| 4,254,362 A * | 3/1981 | Tulleners .................... 315/219 |
| 4,358,712 A * | 11/1982 | Filgas et al. ................ 315/243 |
| 4,390,813 A * | 6/1983 | Stanley ....................... 315/248 |
| 4,480,214 A * | 10/1984 | Sodini ........................ 315/290 |
| 4,590,600 A * | 5/1986 | Beeman et al. ............ 375/346 |
| 4,704,674 A * | 11/1987 | Maehara et al. ........... 363/131 |
| 4,992,922 A * | 2/1991 | Ishimura et al. ............. 363/59 |
| 5,115,165 A * | 5/1992 | Knoble ......................... 315/92 |
| 5,384,518 A * | 1/1995 | Kido et al. .................. 315/225 |
| 5,548,189 A * | 8/1996 | Williams ..................... 315/224 |
| 5,559,682 A * | 9/1996 | Kanouda et al. .......... 363/21.06 |
| 5,572,093 A * | 11/1996 | Kiefer ........................ 315/289 |
| 5,608,293 A * | 3/1997 | Blom .......................... 315/219 |
| 5,892,336 A * | 4/1999 | Lin et al. .................... 315/291 |
| 6,028,398 A * | 2/2000 | Kawasaki et al. .......... 315/224 |
| 6,072,280 A * | 6/2000 | Allen ........................ 315/185 S |
| 6,081,076 A * | 6/2000 | Ogawa .................... 315/241 P |
| 6,255,783 B1 * | 7/2001 | Parker ........................ 315/219 |
| 6,356,462 B1 * | 3/2002 | Jang et al. ..................... 363/17 |
| 6,380,695 B1 * | 4/2002 | Lin et al. .................... 315/291 |
| 6,414,447 B1 * | 7/2002 | Kitamura et al. ........... 315/272 |
| 6,515,437 B1 * | 2/2003 | Zinkler et al. .............. 315/312 |
| 6,531,833 B1 * | 3/2003 | Backs et al. ................ 315/290 |
| 6,545,415 B1 * | 4/2003 | Ward ............................ 315/56 |
| 2001/0020830 A1 * | 9/2001 | Rast et al. ................... 315/172 |
| 2002/0047601 A1 * | 4/2002 | Shannon et al. ........... 315/224 |
| 2003/0025659 A1 * | 2/2003 | Kondo et al. ................. 345/87 |
| 2004/0113566 A1 * | 6/2004 | Nemirow .................... 315/291 |

OTHER PUBLICATIONS http://www.asm-circuits.com/electronic)circuit_ products/ electro luminescent_lamps_manufactures_india.html.*
http://wolfstone.hallowenhost.com/ TechBase?cmptfr_Transformers.html.*

* cited by examiner

*Primary Examiner*—Don Wong
*Assistant Examiner*—Angela M Lie
(74) *Attorney, Agent, or Firm*—Thomas, Kayden, Horstemeyer & Risley

(57) ABSTRACT

An electronic device having an illumination circuit. The illumination circuit utilizes an AC current of an AC driving device to drive an illumination device such as an electroluminescent lamp and the remaining life of the AC driving device indicated by the brightness of illumination device.

11 Claims, 4 Drawing Sheets

ELECTRONIC DEVICE WITH ILLUMINATION CIRCUIT AND EL DEVICE UTILIZING THE SAME

BACKGROUND OF THE INVENTION

1. Field of the Invention

The present invention relates to an electronic device having a driving circuit and more particularly to an electronic device having an illumination circuit.

2. Description of the Related Art

Currently electroluminescent lamps (EL) are employed in a wide variety of household appliances. ELs have the advantages of slim profile, low heat generation, low power consumption, and high fidelity color. For example, some video projectors employ ELs to emit light showing their company marks, to generate brand awareness.

In general, ELs require alternating current (AC) supplied by a power transformation device. As shown in FIG. 1, the conventional video projector has an EL driving chip 300 and an EL 200. Using the EL driving chip 300 has some disadvantages. For example, the EL driving chip 300 is costly. Moreover, when used, the EL driving chip 300 requires an additional protection circuit or must be electrically isolated, to meet safety specifications.

Additionally, the maximum output voltage of the EL driving chip 300 is limited to 100 volts. The brightness of the EL is directly proportional to the output voltage of the EL. An EL can provide more brightness with a relatively higher voltage. As shown in FIG. 2, the brightness of the EL is enhanced when the output voltage supplied by the EL driving circuit is higher. Therefore, the brightness of the EL can be enhanced by increasing the output voltage of the EL driving circuit.

A video projector using an AC lamp comprises an AC lamp device having an AC lamp device and an AC driving unit (or a ballast). The ballast supplies a power higher than a hundred watts to drive the AC lamp. A small portion of the power can be utilized by an illumination display unit (for example, the EL), thereby reducing the cost of the video projector.

FIG. 3 is a graph showing a current of the AC lamp. As shown in FIG. 3, compared with the current required by the EL, the current of the AC lamp can be referred to as a stable AC current. If a portion of the AC current can be utilized to drive the EL indirectly, an additional current source is unnecessary, thereby reducing the cost thereof.

The present invention provides an effective solution for reducing down the cost of the EL driving chip 300 and to enhance the brightness of the EL.

SUMMARY OF THE INVENTION

It is therefore an object of the present invention to provide a circuit design structure for increasing brightness of an illumination device.

The illumination circuit drives a load according to an electronic device. The driving circuit comprises a current transformer and an induced impedance. The current transformer has a primary winding and a secondary winding. The primary winding is coupled to the AC device. The AC device transmits the AC current to the primary winding, such that the secondary winding generates an induced current. The induced impedance connects the secondary winding in parallel for generating an induced voltage according to the induced current. The load is connected with the induced impedance in parallel.

The present invention further provides an electronic device with an illumination function comprising a first load, an AC driving unit, a current transformer, a second load, and a transformation device. A current flowing on the first load is reduced over time. The AC driving unit generates an AC current to drive the first load. The current transformer comprises a primary winding and a secondary winding. The primary winding is coupled between the first load and the AC driving unit, such that the secondary winding generates an induced current. The second load has an illumination function. A brightness level of the second load is changed according to an AC driving voltage and corresponds to an operating duration of the first load. The transformation device is connected with the secondary winding and the second load in parallel for transforming the induced current to the AC driving voltage to drive the second load.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

Figure 1:
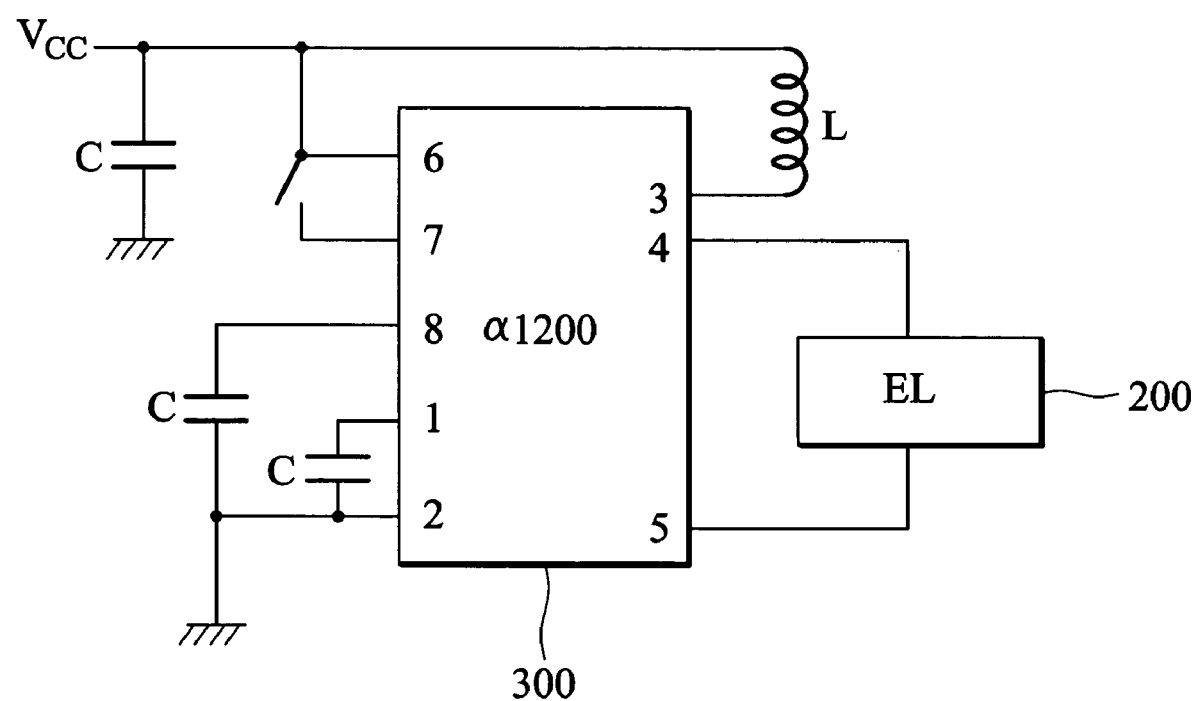
FIG. 1 is a block diagram of the conventional video projector.
Figure 2:
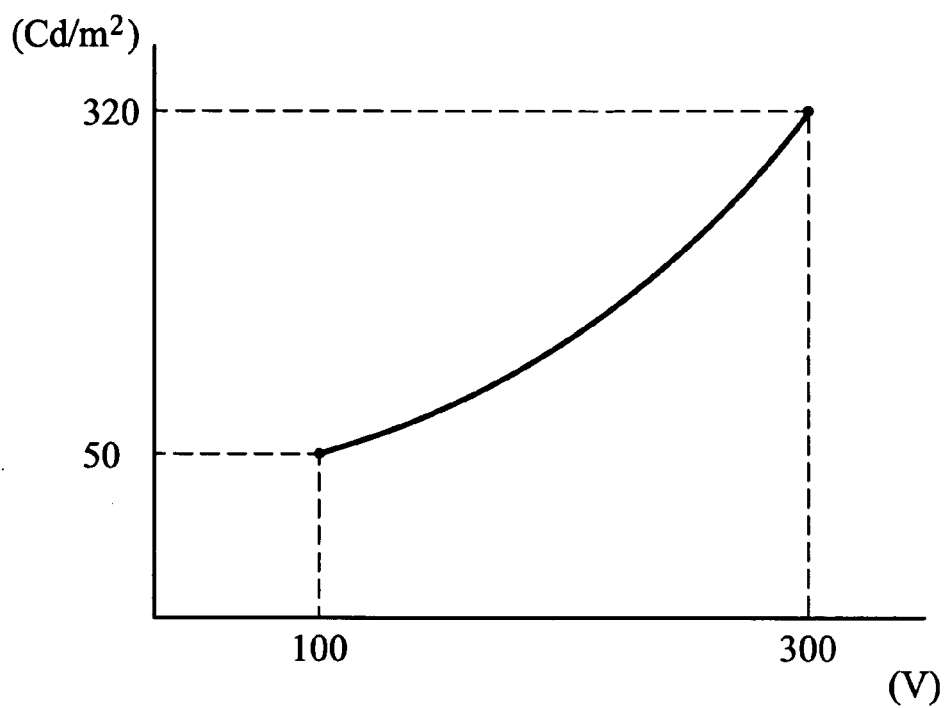
FIG. 2 shows a characteristic curve of an EL.
Figure 3:
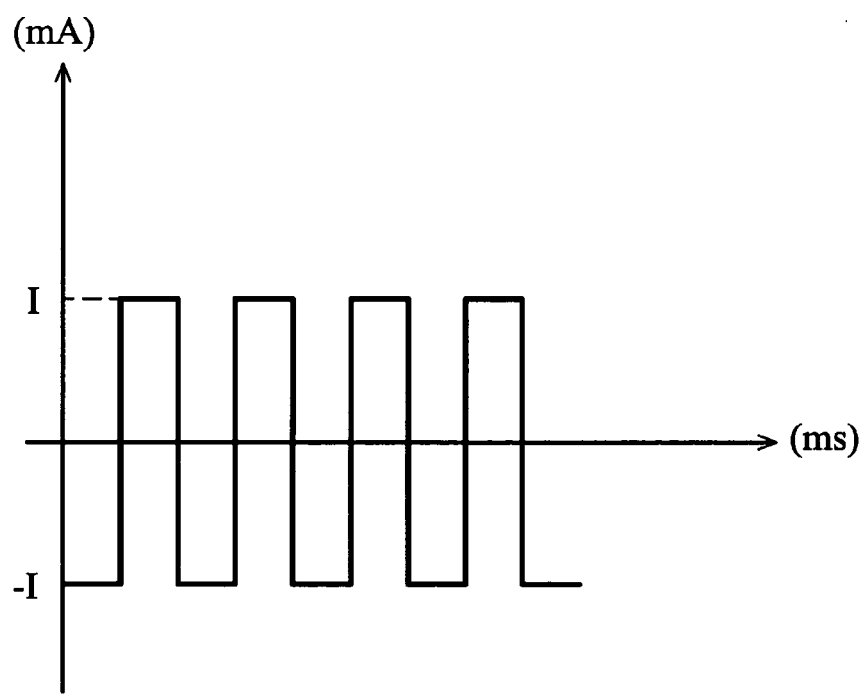
FIG. 3 is a characteristic curve of an AC lamp.
Figure 4:
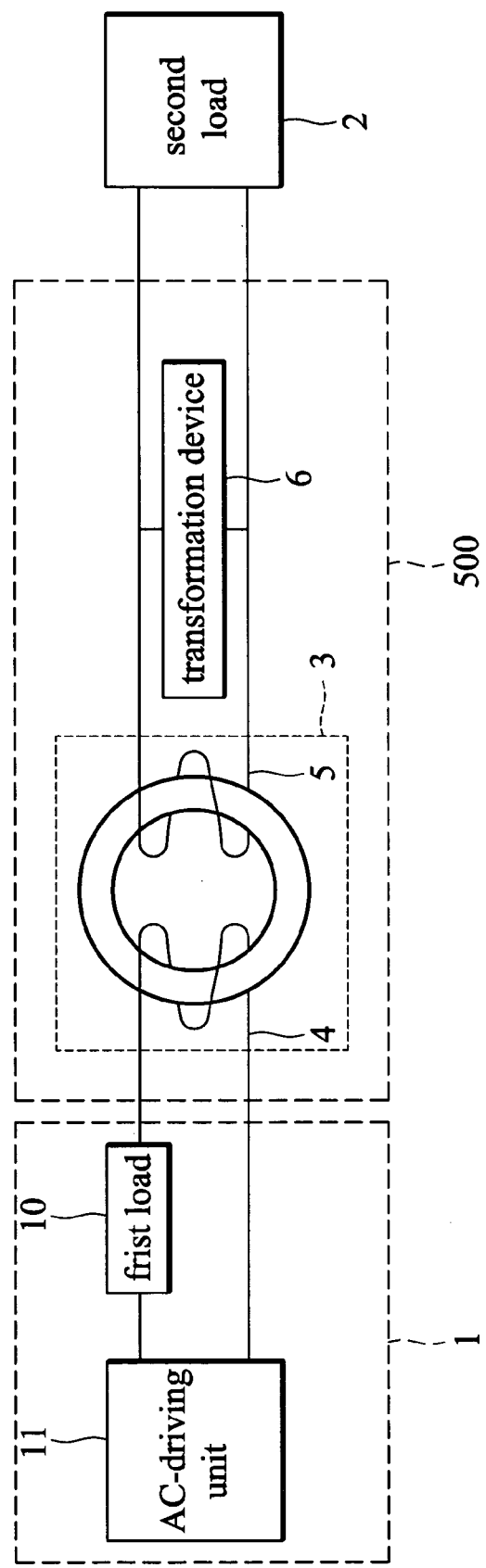
FIG. 4 is a block diagram of the electronic device of the present invention.

FIG. 4 is a block diagram of the electronic device of the present invention. The electronic device comprises an alternating current (AC) device 1, a second load 2, and a driving circuit 500. The driving circuit 500 drives the second load 2 according to an AC current of the AC device 1.

The AC device 1 comprises a first load 10 and an AC driving unit 11. The AC driving unit 11 generates an AC current to drive the first load 10. A current flowing on the first load 10 is reduced over time.

The driving circuit 500 comprises a current transformer 3 and a transformation device 6. The current transformer 3 comprises a primary winding 4 and a secondary winding 5. A coil number of the primary winding 4 is smaller than the secondary winding 5. The primary winding 4 is coupled between the first load 10 and the AC driving unit 11 such that the secondary winding 5 generates an induced current. The transformation device 6 is connected with the secondary winding 5 and the second load 2 in parallel for transforming the induced current to the AC driving voltage to drive the second load 2.

Figure 5:
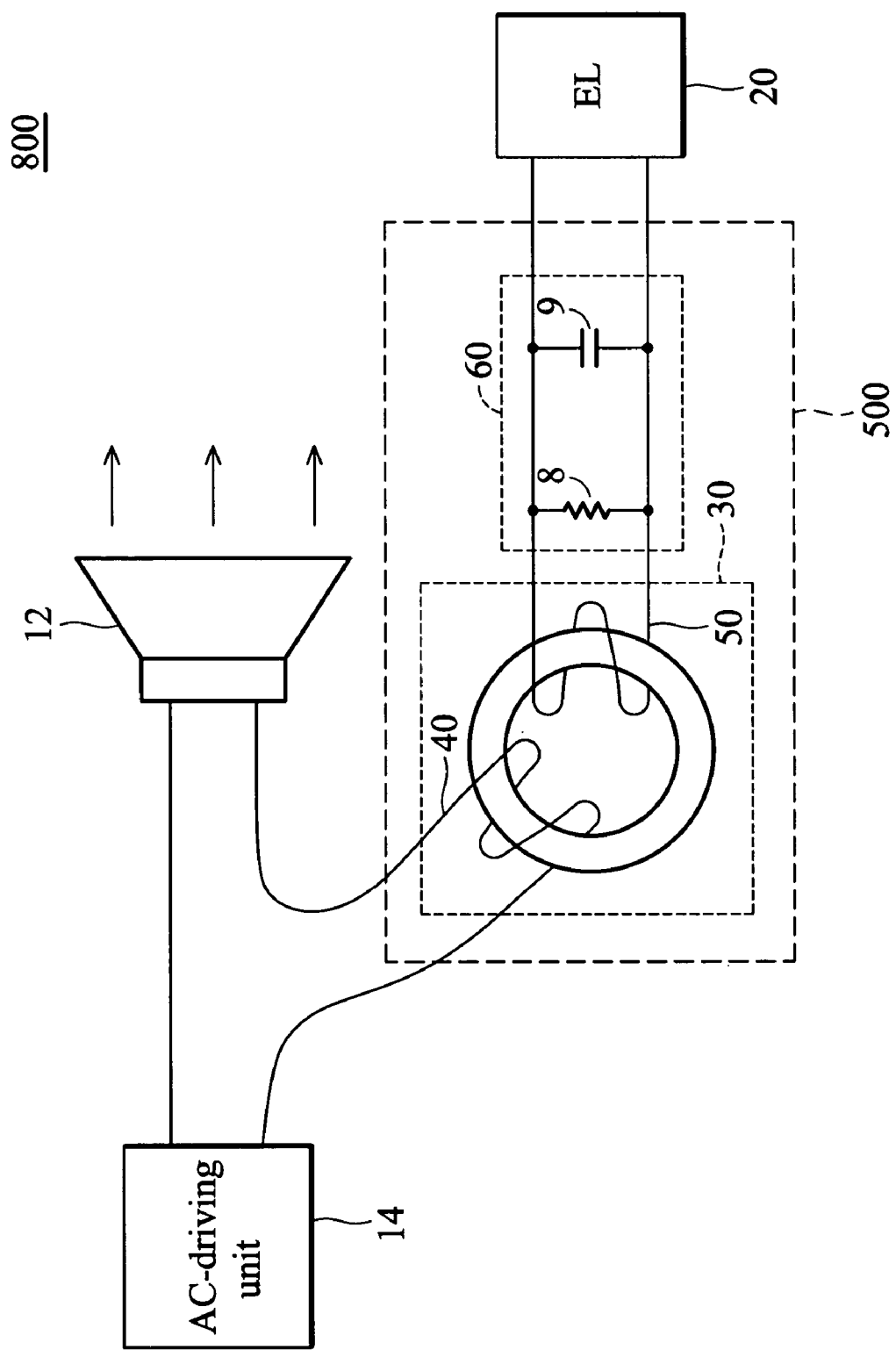
FIG. 5 is a block diagram of a video projector.

The present invention is applied in a video projector. FIG. 5 is a block diagram of the video projector. The video projector 800 has the illumination circuit. The video projector 800 comprises an AC lamp 12, an AC driving unit 14, a current transformer 30, an EL 20, and a transformation device 60. The AC lamp 12 provides a light source. The AC lamp 12 emits light according to an AC current provided from the AC driving unit 14. The EL 20 has an illumination function.

The current transformer 30 outputs an induced current according the AC current. The current transformer 30 comprises a primary winding 40 and a secondary winding 50. The primary winding 40 is coupled between the AC lamp 12 and the AC driving unit 14, such that the secondary winding 50 generates the induced current. A coil number of the primary winding 40 is smaller than the secondary winding 50.

The transformation device 60 is connected with the secondary winding 50 and the EL 20 in parallel, for transforming the induced current to the AC driving voltage to drive the EL 20.

A current flowing on the EL 20 is reduced over time such that the induced current and the AC driving voltage are smaller. Therefore, the illumination provided by the EL 20 is smaller.

The life of the EL 20 is indicated according the brightness of the EL 20. The AC driving voltage flowing on the EL 20 is larger when the EL 20 is new. Therefore, the brightness of the EL 20 is larger. The AC driving voltage is reduced over the life of the EL 20.

In this embodiment, the transformation device 60 comprises an impedance 8 and a capacitor 9. The impedance 8 transforms the induced current to the AC driving voltage. The capacitor 9 is a low-pass filter.

There is no EL driving chip needed in the video projector 800, hence cost is reduced. The current transformer 30 provides not only a simple circuit but also achieves a better electric isolating effect for conforming to safety specifications. The present invention indicates the remaining life of the AC lamp according to the brightness of the EL 20.

Generally, the power loss of the EL is less than 1 watt and compared to the energy output by the AC driving unit, power consumption of the present invention does not influence the video projector.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device having an illumination circuit, comprising:
   a first load;
   an AC driving unit for generating an AC current to drive the first load;
   a current transformer having a primary winding and a secondary winding, wherein the primary winding is connected with the first load in series and coupled to an AC driving transformer, such that the secondary winding generating an induced current according to the AC current;
   a second load having an illumination function; and
   a transformation device comprising a low-pass filter and an impedance, coupled to the secondary winding and the second load for transforming the induced current to an AC driving voltage to drive the second load.

2. The electronic device as claimed in claim 1, wherein a current flowing on the first load becomes smaller and brightness of the second load is reduced over time.

3. The electronic device as claimed in claim 1, wherein the electronic device is a video projector.

4. The electronic device as claimed in claim 1, wherein the first load is an AC lamp.

5. The electronic device as claimed in claim 1, wherein the second load is an electroluminescent lamp.

6. The electronic device as claimed in claim 1, wherein a coil number of the primary winding is smaller than a coil number of the secondary winding.

7. An electronic device having an illumination circuit, comprising:
   a first load, wherein a current flowing on the first load is reduced as time increased;
   an AC driving unit for generating an AC current to drive the first load;
   a current transformer having a primary winding and a secondary winding, wherein the primary winding is coupled between the first load and the AC driving unit, such that the secondary winding generates an induced current;
   a second load having an illumination function, wherein brightness of the second load is changed according to an AC driving voltage and wherein the brightness of the second load corresponds to an operating duration of the first load; and
   a transformation device comprising a low-pass filter and an impedance, connected with the secondary winding and the second load in parallel, for transforming the induced current to an AC driving voltage to drive the second load.

8. The electronic device as claimed in claim 7, wherein a coil number of the primary winding is smaller than a coil number of the secondary winding.

9. The electronic device as claimed in claim 7, wherein the electronic device is a video projector.

10. The electronic device as claimed in claim 7, wherein the first load is an AC lamp.

11. The electronic device as claimed in claim 7, wherein the second load is an electroluminescent lam.

* * * * *